Oct. 9, 1956
K. A. KNUTSEN
2,765,982
DETECTING ERRORS IN ACCOUNTING MACHINES
Filed Jan. 24, 1951
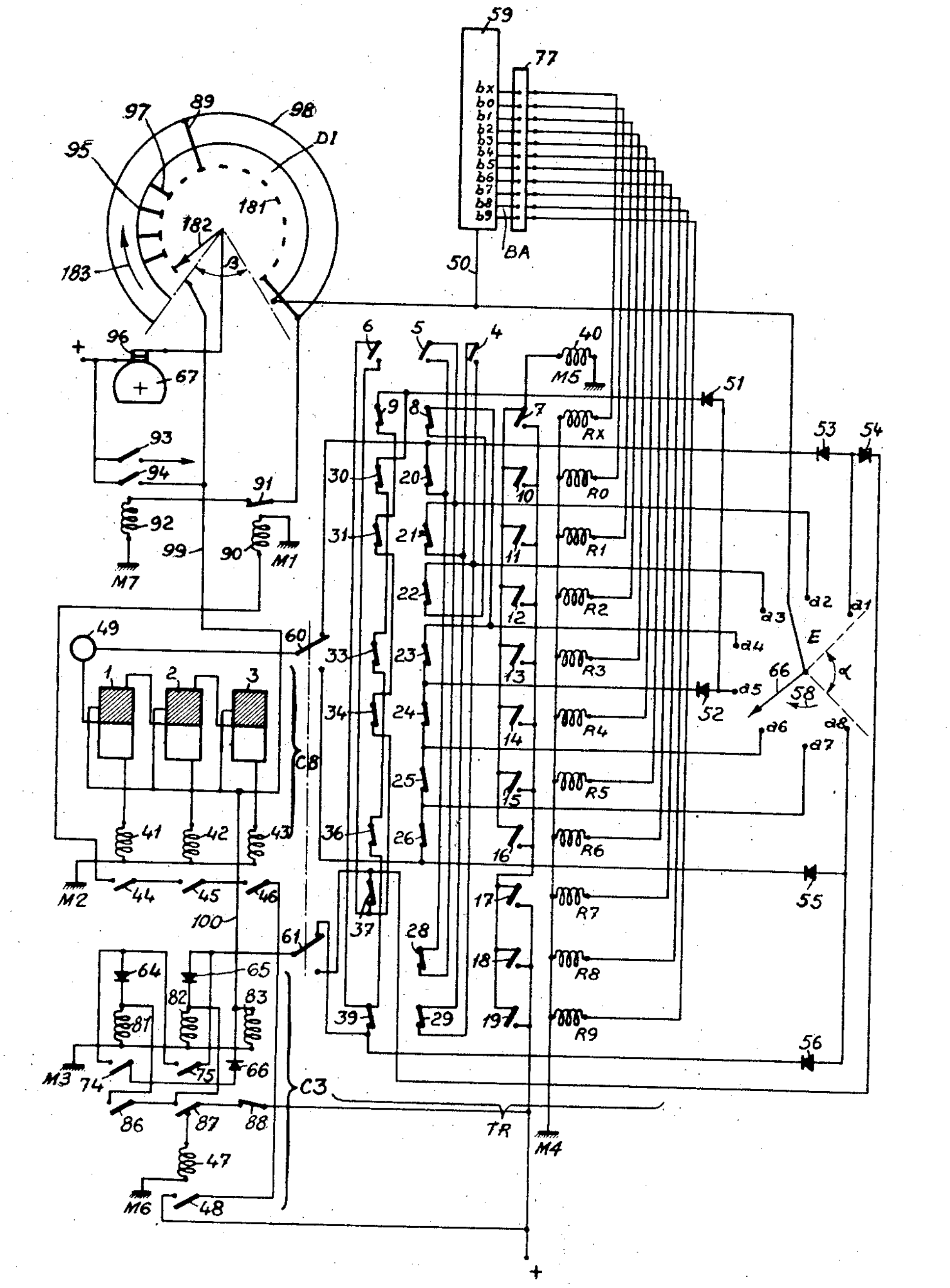
INVENTOR
KNUT ANDREAS KNUTSEN
By: Haseltine, Lake & Co.
AGENTS

United States Patent Office 2,765,982

Patented Oct. 9, 1956

2,765,982

DETECTING ERRORS IN ACCOUNTING MACHINES

Knut Andreas Knutsen, Paris, France, assignor to Compagnie des Machines Bull (Societe Anonyme), Paris, France, a company of France Application January 24, 1951, Serial No. 207,555

Claims priority, application France February 17, 1950

14 Claims. (Cl. 235—61.7)

The present invention relates primarily to a modification of the principle already described in copending application Ser. No. 190,507 filed October 17, 1950. According to this principle, in order to detect or avoid errors in the transcription or utilization of the data recorded on the card of an accounting machine provided in the usual manner with a registered number, there is recorded, by means of marks located in suitable positions, a supplementary datum called checking symbol, more or less in the immediate neighbourhood of the marks representing the said number and in a location so determined that the total number formed satisfies a simple arithmetical property.

In the practical embodiment disclosed in the copending application, the recorded figures, excluding the symbols, are expressed in the decimal system and the total number formed is divisible by the constant integer eleven.

This case is indeed of particular interest because the symbol thus formed guarantees the accuracy of the number with a high degree of certainty.

The inventive idea of the present specification aims to give checking means which ensure same safeguards and which can be applied to record cards on which data can be registered as twin marks in the same column and as one mark in a column, such marks being respectively representative of a letter and a decimal figure according to actual practice of punched record cards.

Any mark on cards can also be a representative of an arithmetical value according to a code which may be different of actual practice codes.

Then a letter, being registered as two marks in a column, can also have as representative an arithmetical value according to an arithmetical process which associates these two marks. That being, there is a possibility to use a checking process derived from the one described in the copending application to obtain as checking symbol one mark representative of a figure.

However it has appeared as good practice when dealing with accounting documents printed from punched record cards to have a possibility to get also a letter as printed checking symbol (this gives more differentiated symbols and a letter is very easily discerned amongst groups of figures) and, as the two marks of a letter are to be found in actual practice codes in two distinct groups of lines of index point positions, it had been found that it is actually a great advantage to get a possibility to treat distinctly each of the two marks belonging to each of these groups and that mainly for the ease with which an apparatus so fitted can be applied to accounting machines in use.

The checking process according to the present inventive idea has as fundamentals: firstly, alternated additions and subtractions, as for the checking process by eleven, of representative values of marks, according to the odd and even ranks of record columns in which marks are recorded by the means of calculating devices operating in a distinct manner for each of two groups of lines of index point positions; secondly, the checking of divisibility of the two distinct results of above operations by two distinct numbers, each of which is equal to the number of the lines of one of the two groups, and this for the whole of data marks and checking marks associated according to such characters of divisibility.

The checking symbol according to the present inventive idea is then to be calculated and recorded according to the remainders of divisions made on results of analogous alternated operations for the data marks only.

A mark representative of a decimal figure can also be treated in a distinct manner according to the group of lines in which such mark is to be found, but it has also appeared as good practice to get a double check for figures by means allowing a distinct treatment for each of the two mark representative of a letter and a double treatment, according to two divisors, of one mark representative of a decimal figure.

Further in order to detect errors which occur when zeros have not been marked on record cards, for one at least of the two channels of operations of the above double treatment for figures, the record code values of marks are to be increased by one unit or by a number of units which differ from the dividing number related to said channel.

The security of such a checking process may not be always a full one and it varies according to the record card code and to the channels of operation which are in use; but even when the security is not a full one, for reasons of simplicity or ease of adaptation to accounting machines actually in use, such a reduced security has been found to give quite good results for most of the uses to which accounting machines are applied.

The invention relates also to the detailed construction of the control arrangements hereinabove described in a manner similar to that described with reference to the diagram of Fig. 9 of said copending application.

In the said copending application the safety device against errors comprises a transmitter of impulses, a receiver of impulses and an inverting unit permitting the alternate sending in magnitude and also as a complement to the base number, i. e. the addition or subtraction of the impulses sent by the transmitter to the receiver and corresponding to the successive figures. It is evidently possible to establish a safety device in accordance with the abovementioned principles of the present invention by using such elements arranged as indicated.

Nevertheless in the preferred embodiment of the present invention for the fundamental elements of the checking apparatus, use is made of adding machines and of a translating unit comprising a combination of relays and contacts susceptible of carrying out alternately successive additions and subtractions under the control of the figures put in.

It is clear that numerous variants may be applied in the embodiment of the invention without thereby departing from the scope thereof.

Some subject matter of the present invention concerns a control device against errors, wherein, if there is a figure in a column of the datum registered as one mark in usual record card codes, said figure is introduced at the same time into two calculating devices operating respectively on different bases, and if there is a letter in the column, that is to say if there are two marks, each of the marks is put separately in the calculating device which is allotted to it in advance according to its value.

The present invention also concerns a control device having two different control bases operating by exploration of successive columns of the card, with a distributor of impulses common to the two bases.

Other features of the present invention will appear more clearly from the following description of an illustrative example, reference being made to the accompanying drawing.

In the illustrative example, one of the counting devices consists of an electronic counter, which is shown as of the binary type with series-connected triggers and the other is a relay counter one original feature of which is that it comprises the same number of relays as the maximum capacity of the counter owing to the use of unidirectional values.

On the drawing the following principal elements are found:

1. A column distributor DI (controlling the displacement of the exploration from one column to the next);
2. A distributor of impulses E (making one revolution during the time of exploration of a column and the passage to the next). This distributor is common to the two divisors owing to the unidirectional elements 51—56;
3. The group BA of card reading brushes *bx*, *b*0 to *b*9;
4. The exciting relays R*x*, R0—R9 of the chains of selection forming a translating unit TR which effect different connections for letters and figures and which comprises a relay 40 operating only when there are found two perforations in one and the same column;
5. The two alternative switches 60 and 61 cyclically actuated by cam, contact and relay (not illustrated) which enter the counting impulses of translating unit TR alternately in the counters C3 and C8 in positive magnitude and as a complement to the respective divisors;
6. The counters C8 and C3, of respective bases 8 and 3, the one being an electronic counter and the other a relay counter.

The example of checking apparatus illustrated in the drawing can be said a preferred one for it is readily adaptable to a large range of accounting machines which for years have been mass produced.

In that apparatus the record card, on which data to be checked are registered, moves according to the direction of its lines of index point positions under sensing means *bx* to *b*9 of reading station 59; this displacement is effected synchronously column after column with the rotation of wiper 182 over the contacts of distributor DI as indicated by arrow 183; in the same time impulse emitter E and cam 67 execute a complete turn for each column of a card as indicated by arrow 58, wiper 66 going over contacts *a*8 to *a*1 when the marks of a column are under the sensing means and when the rounded part of cam 67 closes contact 96. Switches 60 and 61, which control the input to impulse counters C3 and C8, go from one of their two contacts to the other under control of a cam (not indicated in the drawing) which turns with half the speed of cam 67. Angles $\alpha$ and $\beta$ show respectively the part of a turn of E and DI related to the passage from a column to the next and to the passage from a card to the following one.

For each column of a card in which there is one mark at least to represent a datum value or a checking symbol, distributor DI is fitted with a contact 97 in junction with the internal connector 95 of DI and each contact 89 is in junction with the external connector 98 of the same distributor and is so fitted for any column of the record card to determine the time when a checking of divisibility by 3 and 8 is to be made and immediately after that time the counters C3 and C8 must be returned to their initial state. As in the cited copending application the marks of the checking symbols are to be found in the column next to the last column of data marks or in a column of even rank in respect to this last column supposing said last column is an odd one.

Cam 67 actuates contact 96 which joins, for each column of a record card, wiper 182 of distributor DI to the positive terminal of the apparatus and so voltage appears, by the means of DI and reading station 59, on wiper 66 of impulse emitter E. Relay blades 8, 20 to 26, 28, 29 and 9, 30, 31, 33, 34, 36, 37, 39, which receive and direct impulses towards alternative contacts of 61 and 60, can be connected to ground M2 or M3 (negative terminal of apparatus) through counters C3 and C8. Relay blades 7, 10 to 16 and 17 to 19 are connected in one way to the positive terminal of apparatus and in the other way to ground M5 through relay winding 40 which effects a commutation of circuits, when a figure follows a letter (i. e. when one mark follows two marks from a column to the next) and reciprocally. Relay winding RX to R9 are each directly connected, by one of their extremities to one of the sensing means *bx* to *b*9 of reading station and to positive terminal through card marks (i. e. punched marks) and distributor DI and by the other of their extremities to ground M4 through a common connection.

The relay blades, as they are illustrated in the drawing, are at rest position, no voltage being applied to the apparatus. Alternative switches 60 and 61, on the same drawing, are in the adding position.

In the example of the apparatus illustrated in the drawing, the actual record card code in use is such that one mark (punched mark) is representative of a decimal figure and the order of values of positions of marks in a column (index point positions) is from bottom to top of a card as indicated in the drawing by the order of relay windings R9 to R0. The position related to RX is usually representative of the sign full stop, in the code actually used, when there is one mark in a column; also conventionally, when associated with another mark in the same column, a mark in that position is representative of a 10. The code used is such that, for letters, there is a mark in the group of lines of positions 7, 8, and 9 and a mark in the group of lines of positions X (for 10), 0, 1, 2, 3, 4, 5, and 6 and the cyclical counters C3 and C8 have respectively 3 and 8 steps of operations. The double check of figures used in the present apparatus is done, according to their congruences modulo 3 and modulo 8, by both counters C3 and C8, each receiving alternatively a number of impulses according to the value of position of marks increased by one and a number of impulses equal to the complements to 3 and 8 of same numbers of impulses. It is to be noted that the same actual record card code does not distinguish between letters I and O and figures 1 and 0 which have the same form (block letters) on accounting documents printed from the sensing of record cards.

Impulse emitter E is built to send impulses, in the same operation, on alternative switch 60 of counter C8 and on alternative switch 61 for counter C3 and there is no interference between the two channels of operation owing to the fitting of unidirectional elements 51 to 56. By its structure, the same emitter adds one impulse for each mark sensed on a card, when 60 and 61 are in the adding position; the total number of impulses being reduced modulo 3 and modulo 8. A mark (punched) on the card, when a column is sensed, lets a flow of current pass through one relay winding RX to R9, and distributor DI causes voltage to appear on wiper 66 of emitter E. For decimal figures, owing to the inversion of connections between relay blades 16 and 17, relay winding 40 is not excited. The energization of relay 40 requires that both one of relay windings RX to R6 and one of relay windings R7 to R9 be under voltage; in the case of figures, only one of the relay windings RX to R9 is in such a state.

When alternative switches 60 of C8 and 61 of C3 are in the adding position and when R6 is excited (corresponding to the Figure 6) relay blades 26 and 36 break their contacts and wiper 66 of emitter E goes over contacts *a*8 to *a*1: contact *a*8 of emitter E, owing to the opening of 26, has no action on *c*8; contact *a*7 sends an impulse towards 60 and *c*8 through relay blades 25, 24, 23, 8, 22, 29, 21, 28, and 20, and unidirectional elements 52 and 53 impede any action of that impulse on counter C3 through elements 51 and 54; in the same manner, contact *a*6 sends an impulse towards C8 through relay blades 24, 23, 8, 22, 29, 21, 28, and 20, elements 52 and 43 acting as precedently. It is easy to see, when following circuits in the same manner, that each contact of emitter E after *a6* will send an impulse to counter C8, which receives seven impulses for all contacts. Owing to the opening of relay blades 36, when wiper 66 goes over *a5*, no impulse goes towards C3 through 51, 30, 33, 36 and 39; for *a1* in the same manner, same blades 36 break circuit 54, 37, 31, 9, 30, 33, 36 and 39 towards C3. The only active contact for C3 is *a8* through unidirectional elements 56; counter C3 receives only one impulse when R6 is excited.

It will clearly appear, when following circuits in the same manner, that, when R5 (corresponding to *a5*) is excited and 60 and 61 are in adding position, counter C8 respectively receives 7, 6, 5, 4, 3, 2, and 1 impulses for the marks representative of figures 6, 5, 4, 3, 2, 1 and 0 as counter C3 receives respectively 1, 3, 2, 1, 0, 2 and 1 impulses for the same figures.

When alternative switches 60 of C8 and 61 of C3 are in subtracting position and when R6 (corresponding to *a6*) is excited, relay blades 26 and 36 break their contacts and wiper 66 of emitter E goes over contacts *a8* to *a1*: contact *a8* is the only one to send an impulse to counter C8 and 1 is the complement to 8 of 7. Counter C3, in the same time, receives impulses from E when wiper 66 goes over *a5* and *a1*; thus two impulses are sent and 2 is the complement to 3 of 1.

When following circuits as above indicated, having always in mind the action of unidirectional elements 51 to 56, it can be seen that, when 60 is in subtracting position, counter C8 receives respectively 1, 2, 3, 4, 5, 6 and 7 impulses for the sensing of marks representative of figures 6, 5, 4, 3, 2, 1 and 0, and counter C3, at the same time, receives respectively 2, 3, 1, 2, 3, 1 and 2 impulses for the same figures.

When alternative switches 60 of C8 and 61 of C3 are in adding position and when R7 (corresponding to *a7*) is excited, relay blade 37 breaks its contact and wiper 66 of emitter E goes over contacts *a8* to *a1*, counter C8 receives then 8 impulses through relay blades 26 to 20, unidirectional elements 55, 52 and 53 preventing any impulses intended for C8 from going to C3. Owing to the opening of 37, counter C3 does not receive an impulse when 66 goes over *a1*, which impulse would have to go through 54, 37 and 39, but receives an impulse when 66 goes over *a5*, said impulse going through 51, 30, 33, 36 and 39, and another impulse for contact *a1*, through 54; thus 2 impulses are being sent.

When alternative switches 60 of C8 and 61 of C3 are in subtracting position and when R7 is excited, counters C8 and C3 receive respectively 8 and 1 impulses.

In the same manner, when R8 is excited and relay blade 28 breaks its contact, the chain of relay blades 20 to 26 is interrupted between 20 and 21 and counter C8 receives 1 impulse when adding, and 7 impulses when subtracting. In this case counter C3 receives 3 impulses for addition or subtraction.

When R9 is excited and relay blades 29 and 39 break their contacts, the chain of relay blades 20 to 26 is interrupted between 21 and 22 and counter C8 receives 2 impulses when adding, and 6 when subtracting. In this case counter 3 receives 2 impulses when adding and one when subtracting. When RX is excited and relay blades 8 and 9 break their contacts, the chain of relay blades 20 to 26 is interrupted between 22 and 23 and counter C8 receives 3 impulses when adding and 5 impulses when subtracting. In this case counter C3 receives 2 impulses when adding and 1 when subtracting.

The record card code, in this example of operation of the inventive idea of the present application, makes use of two marks in a column as representative of a letter and, as it has been above explained, each of these two marks are to be found in two distinct groups of index point positions, one mark being in a position X, 0, 1, 2, 3, 4, 5 or 6 and the other in a position 7, 8, and 9.

In the present example, translating unit TR treats separately each of the two marks of a letter as if the marks were the representatives of two figures. Owing to the structure of impulse emitter E, when adding, the number of impulses related to each of these marks is increased by one in respect to the value of position of each of said marks on cards, and, when subtracting, the number of impulses related to same value is the complement of the preceding one to 3 or 8 according to the group of lines of index point positions, in which the mark is, the two marks of a letter being treated by the apparatus at the same time.

When two marks in the same column are under the sensing means of reading station 59, one of the relay blades 7 and 10 to 16 and one of the relay blades 17, 18, or 19 of translating unit TR are closed at the same time and so relay winding 40 is excited: relay blades 4, 5, and 6 are also closed and any break of contact of relay blades 28 and 29 is shunted.

In the record card code in use a letter A, for example, is marked on the card by a figure mark 7 and a mark X; when these marks come under the reading station 59, relay blades 8, 9, and 37 break their contacts and wiper 66 of impulse emitter E goes over contacts *a8* to *a1*: alternative switches 60 and 61 being in adding position, counter C8 receives an impulse when wiper 66 goes over *a3*, *a2* and *a1*, thus furnishing 3 impulses, and counter C3 receives 2 impulses when brush 66 goes over *a8* and *a5*. In the same manner, alternative switches being in subtracting position, counters C8 and C3 receive respectively 5 and 1 impulses.

In these conditions, the passage of wiper 66 over *a8* gives an impulse going to subtracting contact of 60 and an impulse going to adding contact of 61; the passage over *a7* gives an impulse going to subtracting contact of 60 and unidirectional elements 52 and 55 stop any action of said impulse on circuit going to 61 through 51 and 56. The passage over *a6*, in the same manner, gives only one impulse going to subtracting contact of 60; the passage over *a5* gives an impulse going to adding contact of 60 and an impulse going to adding contact of 61 and unidirectional element 56 stops any action of said impulse on circuit going to 60 through 55; the passage over *a4* gives only one impulse going to subtracting contact of 60 and unidirectional elements 52 and 55 stop any action of said impulse on circuit going to 61 through 51 and 56; the passage over *a3* gives only one impulse going to adding contact of 60 and unidirectional element 53 stops any action of said impulse on circuit going to 61 through 54; the passage over *a2*, in the same manner, gives only one impulse going to adding contact of 60; at last, the passage of wiper 66 on *a1* gives an impulse going to adding contact of 60 and an impulse going to subtracting contact of 61.

The following table gives, for figures, the number of impulses going to the alternatively adding and subtracting counters C8 and C3.

*Table I*

| Figures | Counter C8 | | Counter C3 | |
|---|---|---|---|---|
| | Addition | Subtraction | Addition | Subtraction |
| X | 3 | 5 | 2 | 1 |
| 0 | 1 | 7 | 1 | 2 |
| 1 | 2 | 6 | 2 | 1 |
| 2 | 3 | 5 | 3 | 3 |
| 3 | 4 | 4 | 1 | 2 |
| 4 | 5 | 3 | 2 | 1 |
| 5 | 6 | 2 | 3 | 3 |
| 6 | 7 | 1 | 1 | 2 |
| 7 | 8 | 8 | 2 | 1 |
| 8 | 1 | 7 | 3 | 3 |
| 9 | 2 | 6 | 1 | 2 |

The following table gives, for letters, the number of impulses going to the alternatively adding and subtracting counters C8 and C3 according to an actual record card code.

*Table II*

| Letters | Record Card Code | COUNTER C8 | | COUNTER C3 | |
|---|---|---|---|---|---|
| | | Addition | Subtraction | Addition | Subtraction |
| A | 7, X | 3 | 5 | 2 | 1 |
| B | 7, 0 | 1 | 7 | 2 | 1 |
| C | 7, 1 | 2 | 6 | 2 | 1 |
| D | 7, 2 | 3 | 5 | 2 | 1 |
| E | 7, 3 | 4 | 4 | 2 | 1 |
| F | 7, 4 | 5 | 3 | 2 | 1 |
| G | 7, 5 | 6 | 2 | 2 | 1 |
| H | 7, 6 | 7 | 1 | 2 | 1 |
| J | 8, X | 3 | 5 | 3 | 3 |
| K | 8, 0 | 1 | 7 | 3 | 3 |
| L | 8, 1 | 2 | 6 | 3 | 3 |
| M | 8, 2 | 3 | 5 | 3 | 3 |
| N | 8, 3 | 4 | 4 | 3 | 3 |
| P | 8, 4 | 5 | 3 | 3 | 3 |
| Q | 8, 5 | 6 | 2 | 3 | 3 |
| R | 8, 6 | 7 | 1 | 3 | 3 |
| S | 9, X | 3 | 5 | 1 | 2 |
| T | 9, 0 | 1 | 7 | 1 | 2 |
| U | 9, 1 | 2 | 6 | 1 | 2 |
| V | 9, 2 | 3 | 5 | 1 | 2 |
| W | 9, 3 | 4 | 4 | 1 | 2 |
| X | 9, 4 | 5 | 3 | 1 | 2 |
| Y | 9, 5 | 6 | 2 | 1 | 2 |
| Z | 9, 6 | 7 | 1 | 1 | 2 |

The quality of the control does not lie in the real value of each of the figures of the number to be controlled, and at 77 there is provided a switch box for arbitrary permutation of the connections if desired.

The counter C8 is of a conventional binary type in which 1, 2 and 3 are electronic triggers (of Eccles-Jordan type by way of example); they have two equally stable stakes of equilibrium and are controlled by the means of negative impulses acting through symmetrical inputs on the control grids of groups of two tubes forming each a trigger. For that reason the positive impulses given by the alternative contact 60 are changed into negative ones in a well known manner, by the tube 49. As it has been described in a co-pending application, Serial Number 171,684, use is made of an asymmetrical input to the control grid of one tube of each trigger, to ensure in this case that, at the beginning of a checking operation, the three triggers are in a state conventionally representative of zero: that state is indicated on the drawing by the hatching of the top halves of rectangles 1, 2 and 3 and is controlled by a relatively lengthy impulse coming from the first active contact of distributor DI to the asymetrical inputs.

When the triggers are in such a zero state, each of relay windings 41, 42 and 43 is connected, between the plates of inactive (or not fired) tubes of each trigger (these plates are then at their highest positive voltage) and ground M2; being so connected, the relay windings are then able to make bend the related relay blades 44, 45 and 46 on their contacts. This closes the circuit of the checking relay 90, between the positive terminal of the apparatus and ground M1 if the relay blade 48 of counter C3 is also closed.

For each of the triggers 1, 2 and 3, it can be said that a trigger is in the "0" state when in the state indicated above and conventionally the other state of the same trigger is called a "1" state. In these conditions, starting from a "0" state for the three triggers: an impulse coming from alternative contact 60 sets trigger 1 to "1" state, leaving triggers 2 and 3 in "0" state; two impulses from 60 reset trigger 1 to "0" state, setting trigger 2 to "1" state and leaving trigger 3 in "0" state . . . and so on in a known manner, state "1" of triggers 1, 2 and 3 indicating respectively the action of 1, 2 and 4 impulses and these numbers of impulses being representatively added by the counter. There is no carry-over out of trigger 3, eight impulses, or any number of impulses which is a multiple of eight, leaving that type of counter in the zero state of triggers 1, 2 and 3.

The counter C3 is a special relay counter, using only three relay windings. A first impulse, going from alternative contact 61 to ground M3, through unidirectional element 65 and relay winding 82, sets relay blade 75 on its contact, but this action is a delayed one and is not accomplished till the impulse is faded to avoid action on relay winding 81. Relay blade 87 makes contact at the same time on the connection going to 82 and blocks 75 on its contact, unidirectional element 65 prohibiting any action of the positive terminal of the apparatus on relay winding 81 through 88, 87 and 75. In the same manner a second impulse, coming from 61 and going through 75, 64 and 81 to ground M3, closes relay blades 74 and 86, unidirectional element 64 acting as 65 has done for the first impulse. Thus the chain of relay blades 88, 87 and 86 being completed, a third impulse coming from 61 goes through 75, 74 and 66 and makes a live relay-winding 83; then relay blade 88 breaks its contact; relay blades 86, 87, 74 and 75 following; the counter C3 is returned to zero state and 88 retrieves its contact. So, relay blade 87 completing the circuit from positive terminal to ground M6 through relay winding 47, relay blade 48 closes its contact to close the chain of relay blades 48, 46, 45, and 44 and to complete the circuit of checking relay winding 90 from positive terminal to ground M1 so that relay blade 91 breaks its contact.

Counters C3 and C8, having respectively reacted to a plurality of impulses in number of a multiple of 3 and 8 to return in zero state, have checked that the values of data and checking marks read on a record card by the sensing means of reading devices *bx* to *b9* of 59, these values being treated as above described, act on the counters like a number of impulses which is divisible by 3 and 8, then by 24. These characters of divisibility, on which the check is based, are comprised in the apparatus which is just an example amongst others, of apparatuses which can be made according to the inventive idea described.

In the illustrated apparatus, when the reading of values of data and checking marks do not give rise to a number of impulses that return both counters back to the zero state and when wiper 182 of distributor DI goes over a checking contact, such as 89, then relay blade 91 is on its contact and a current flows from positive terminal of the apparatus to ground M7 through 91 and relay winding 92 which causes the contacting of relay blades 93 and 94 with their contacts. Relay blade 93 directs current from said positive terminal for instance to a connected accounting mechanism, a card sorter, a locking device, an error indicating system, an error marking punch or any other connected device. Relay blade 94 then directs a relatively lengthy impulse towards the zeroizing asymmetical inputs of counter C8 and to relay winding 83 through connection 100 which breaks 88 and thus releases relay blades 86 and 87 of counter C3, said impulse resetting both counters to zero state.

On the same principle as above described, and with certain modifications readily made on the basis of the prior art, there may be provided punches for the perforation of symbols, verifying devices, symbol signaling or blocking devices in case of error, etc. . . . The counters may then be provided with elements controlled by their successive positions.

In the described apparatus which is a practicable adaptation of the inventive idea of the present application, there are limits in the security of the check of data; but, as described above, such a limited security may be actually of great practical value in automatic accounting machine where said apparatus completes the usual means employed to verify the registering of data and to ensure with a sufficient security the reading of said data.

The possibility of errors is relatively low; the figures (see Table I) 5, 2 and 8 are not distinguished one from the other by counter C3 but an error consisting in one of these three figures being replaced by another one of said three figures would be detected by the other counter C8, that is each figure is checked in a complete manner by at least one counter; for the letters (see Table II) none of the counters can discern between T and zero; between C, the figure one and the letter I; between J, M and 2; between W and 3; between F and 4; between Q and 5; between Z and 6; between K and 8; between U and 9; between A, D and X and between S and V. So the described apparatus lacks somewhat in security when checking figures and letters and when checking letters, but generally in using record cards, figures and letters are in distinct groups and the groups of letters are names or business indications for which errors are, in practice, easily distinguished visually.

Further, the twelve lines of index point positions of the usual record cards give the possibility to use a code comprising one group of 7 lines and one group of 5 lines, and then, with a suitable translating unit analogous to the described one, to get a complete check of letters and figures with the exception that it would not be distinguished between the letter O and the figure zero.

If the data to be controlled has only figures no distinction has to be made by the apparatus described between a letter or a figure to be controlled; in this case the relay 40 and the connections starting from its contacts may be eliminated.

A device according to the present invention may be completely independent of the accounting machine, constituting an independent verifying device for the transcription of data. It may also be connected to an accounting machine and in this case the distributor may be a distributor of impulses already comprised in this machine.

I claim:

1. Device for detecting erroneously transcribed data on records for accounting machines, said data comprising a series of items including one checking item, each item being located in a separate one of a plurality of columns of the record, said device comprising two differently calculating apparatuses, reading out means for reading successively said items, means for simultaneously entering numbers corresponding to the items read into both said apparatuses, the numbers corresponding to adjacent items being entered in succession alternately as true values and as values complementary to two different predetermined base values, and means for detecting an eventual discordance between a predetermined position of each apparatus, called the zero state, before a checking operation, and the position of each apparatus after said checking operation.

2. Device for detecting erroneously transcribed data including a checking item on register cards for accounting machines, comprising data reading out means, two cyclic counters of different maximum counting capacity, means for entering into both counters distinctive numbers corresponding to the items read on the card by said data reading out means, the said numbers being entered alternately in their true value for an item and in complement to the respective capacity for the next item continuously until the last item of the data to be controlled has been exploited by both counters; and means utilizing the positions of both counters thereby to evidence an eventual error in said data when said last item has been exploited.

3. In an accounting machine, a device for detecting errors due to misreadings of data on register cards by said machine, such data comprising a series of recorded items and a checking item recorded as two marks in a card column, said device comprising two differently calculating apparatuses, means for entering into each apparatus numbers related to the items of the data read on the card by reading out means of the machine, that is a true value for an item and a complementary value for the next item, means under control of said reading out means to enter separately representative values of said two marks in said apparatuses, one value in each apparatus, and means adapted to utilize an eventual discordance between indications delivered by said apparatuses when all the numbers corresponding to the items of the data to be checked and said values representing said checking item have been exploited by said apparatuses, thereby to check that the indications given by said calculating apparatuses are identical after a checking operation, with those given before said checking operation, and thereby to check the reading of the accounting machine.

4. Device for detecting erroneously transcribed data on register cards for accounting machines, such data comprising a series of items including a checking item, each item being located in a separate one of a plurality of columns of the card and comprising two index values, said device comprising data reading out means for reading two index values in one column of a card, means for introducing both numbers corresponding to those values into a calculating device alternately as a true number for an item and as a complementary number for the next item, means for evidencing an eventual error, and means utilizing the result delivered by said calculating device, when all the numbers corresponding to the different columns of the data to be checked including the checking item have been exploited by the calculating device and when said result corresponds to a status of the calculating device differing from an initial status of rest, for actuating said error evidencing means.

5. Device for detecting erroneously transcribed data on register cards for accounting machines, such data comprising a series of items including one checking item, each item being located in a separate one of a plurality of columns of the card and comprising two index values, said device comprising data reading out means for reading two index values in one same column of a card, means for introducing separately numbers corresponding to those values into two different sections of a calculating apparatus alternately as a true number for an item and as a complementary number for the next item, means for evidencing an eventual error, and means utilizing the results delivered by said sections, when all the numbers corresponding to the different columns of the data to be checked including the checking item have been exploited by both sections of the calculating device and when said results correspond to states of said sections differing from initial states of rest, for actuating said error evidencing means.

6. Device for detecting erroneously transcribed data on register cards for accounting machines, such data comprising a series of items accompanied by one checking item, each item being located in a separate one of a plurality of columns of the card and comprising at most two index values, said device comprising data reading out means for reading at least one of the two index values in one same column of a card, means for separately introducing numbers corresponding to those values into two different sections of a calculating apparatus alternately as a true number for an item and as a complementary number for the next item, and means for evidencing an eventual error in said data when the introduction of two numbers respectively corresponding to the two index values of the checking item, respectively into said sections, fails to set said calculating apparatus to a standard zero position.

7. Device for detecting erroneously transcribed data on records for accounting machines, such data comprising a series of items accompanied by one checking item, each item being located in a separate one of a plurality of columns of the record and comprising at most two index values, said device comprising data reading out means for reading the record column after column, control means for detecting if there is one single or two index values in a column, a calculating apparatus having two sections, means comprising said data reading out means and said control means, for entering alternately as a true value and as a complementary value one number into both sections of a calculating apparatus, or two different numbers into the calculating apparatus, each into one section thereof, respectively when there is one or two index values in a column, the values of the numbers being in correspondence with the index values, and means utilizing the two results furnished by said sections when all the numbers corresponding to the different columns have been exploited by the device thereby to evidence an eventual error.

8. Device for detecting erroneously transcribed data including a checking item on register cards for accounting machines, comprising data reading out means, two cyclic counters of different maximum counting capacity, means for entering distinctive numbers into both counters, alternately in true value for an item and in complement to the respective capacity of the related counter for the next item, continuously until the last item to be controlled has been exploited by both counters, said distinctive numbers being equal to the corresponding numbers of the respective read out index values of each item of a column, plus a constant quantity, and means detecting an eventual discordance between the results given by said cyclic counters before a checking operation for a pre-determined position of each apparatus called the zero position, and after said checking operation.

9. Device for detecting erroneously transcribed data including a checking item on register cards for accounting machines, comprising data reading out means, two cyclic counters having different maximum counting capacities, equal to 8 and 3, means for entering distinctive numbers corresponding to the items read on the card by said data reading out means into both counters, alternately in true value for an item and in complement to the respective capacity for the next item, continuously until the last item of the data to be controlled has been exploited by both counters, and means for detecting the result of both counters and for detecting the discordance with a given result when said last item has been exploited.

10. Device for detecting errors in value data with a checking data annexed thereto registered on cards or bands, said data comprising letters or numbers, each letter or each cipher of said numbers being located in corresponding columns of said cards or bands, said device comprising feeding means for feeding said cards or bands past a sensing station, two cyclic counters of different maximum capacity, sensing means for sensing the data to be controlled with their checking data and entering corresponding ciphers successively column after column into both of said counters, alternately in true value for one column and in complement to the respective capacity for the next column, until the last cipher of the data to be controlled and the annexed checking data have been entered, and means for detecting if the state of each counter after the checking operation, agrees with the state of said counters before such a checking operation, called the zero state.

11. In a record controlled machine with feeding means for feeding a record column after column past a sensing station, a device for detecting errors in value data with a control datum adjacent thereto registered on said record, said data comprising ciphers located in adjacent columns of said record, said device comprising two cyclic counters of different maximum capacity, sensing means for sensing a column in sensing position and for operating intermediate electric setting means corresponding to the cipher sensed, means comprising an alternatively operated switch, an impulse emitter, electric connections between said counters, said switch, said electric setting means and said emitter, for entering a representative number of a cipher from one of said sensed columns in positive value into both counters and for entering into both counters as a representative of a cipher sensed in the next column, the complement to the respective capacity of said counters of the representative number of such a cipher, and means for detecting a discordance between the result of each counter and a given result and for controlling the machine accordingly.

12. A device for detecting erroneously transcribed data including a checking symbol on a record for accounting machines, comprising two calculating devices, data analyzing means for simultaneously entering value representing the numbers of said data including said checking symbol alternately as a true value and as a complementary value into each of said devices, which each calculates in a different manner a result according to the entered numbers, means for detecting a discordance between said two results, and means for indicating such a discordance.

13. A device for detecting erroneously transcribed data including a checking item which are registered in a plurality of columns of a record for accounting machines, said checking item being representative of a letter amongst a determined number of different letters, conventionally arranged in a determined number of groups, each letter being designated by the two index values in a column, one index value indicating a distinct one of said groups and the other indicating an order number in a group, said device comprising reading out means for sensing the two index values representing a letter in a column, two cyclic counters of different maximum capacity, the capacity of the first counter being equal to the totality of numbers in each of said groups and the capacity of the second counter being equal to the number of said groups, said data reading out means sensing the record, column after column, to enter for a column the numbers of the index value representing the groups in one counter and the numbers of the index value representing an order number in said group in the other counter and to enter for the next column in same counters the representative numbers of index values respectively in complement to the respective capacity of the related counters, and means for detecting, when the representative numbers of the data including its checking item have been thus entered, a discordance between the results of each counter and the results indicated by each counter before said entering of said representative numbers of said data and checking item.

14. Device for detecting erroneously transcribed data items accompanied by a checking symbol on a record for accounting machines, said checking symbol being recorded as two marks in a record column, said device comprising two impulse receiving units each having a different number of distinct states and proceeding, upon reception of an impulse, from one said state to the next, reading out means, means for alternately entering a number of impulses representing the true value of a data item and a number of impulses representing a complementary value of the next data item read on the record by said reading out means, into each unit, means under control of said reading out means to enter impulses representing true or complementary values of said two marks in said units, one mark in each unit, and error evidencing means that are actuated by an eventual discordance between a predetermined state of each unit, called the zero state, before a checking operation and the state of each unit after said checking operation.

References Cited in the file of this patent

UNITED STATES PATENTS

| | | |
|---|---|---|
| 2,340,741 | Ghertman | Feb. 1, 1944 |
| 2,359,616 | Bryce | Oct. 3, 1944 |
| 2,377,762 | Daly | June 5, 1945 |
| 2,424,100 | Lang | July 15, 1947 |